United States Patent
Serkin et al.

(10) Patent No.: US 12,523,780 B2
(45) Date of Patent: Jan. 13, 2026

(54) QUASI-ASYNCHRONOUS SAMPLING FREQUENCY GRID

(71) Applicant: Topcon Positioning Systems, Inc., Livermore, CA (US)

(72) Inventors: Fedor Borisovich Serkin, Moscow (RU); Sergey Sayarovich Bogoutdinov, Moscow (RU); Dmitry Yuryevich Goldberg, Moscow (RU); Leonid Valerianovich Edelman, Saint Petersburg (RU); Dmitry Anatolyevich Rubtsov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 293 days.

(21) Appl. No.: 18/547,518

(22) PCT Filed: Aug. 30, 2022

(86) PCT No.: PCT/RU2022/000263
§ 371 (c)(1),
(2) Date: Aug. 23, 2023

(87) PCT Pub. No.: WO2024/049317
PCT Pub. Date: Mar. 7, 2024

(65) Prior Publication Data
US 2024/0192384 A1    Jun. 13, 2024

(51) Int. Cl.
*G01S 19/37*    (2010.01)
(52) U.S. Cl.
CPC .................. *G01S 19/37* (2013.01)
(58) Field of Classification Search
CPC ....................................... G01S 19/37
(Continued)

(56) References Cited

U.S. PATENT DOCUMENTS

| 7,898,475 B2 | 3/2011 | Nayyar et al. |
| 2006/0251173 A1 | 11/2006 | Wang et al. |

(Continued)

FOREIGN PATENT DOCUMENTS

| CA | 2701471 A1 | 10/2011 |
| CN | 101303404 A | 11/2008 |

(Continued)

OTHER PUBLICATIONS

International Search Report and Written Opinion mailed Jun. 8, 2023 in connection with International Application No. PCT/RU2022/000262, filed Aug. 30, 2022, 7 pgs.

(Continued)

*Primary Examiner* — Harry K Liu
(74) *Attorney, Agent, or Firm* — Chiesa Shahinian & Giantomasi PC

(57) ABSTRACT

A Global Navigation Satellite System (GNSS) receiver for processing GNSS satellite signals use a quasi-asynchronous sampling frequency grid to process the received signals. The GNSS receiver includes a plurality of RF paths configured to receive Global Navigation Satellite System (GNSS) signals from an antenna and transmit the GNSS signals in a frequency range for digitizing the GNSS signals. A phase-locked loop is configured to generate a clock signal and a plurality of clock dividers are configured to receive the clock signal and divide the clock signal. Each of a plurality of navigation systems receive a clock signal from one of the plurality of clock dividers.

20 Claims, 14 Drawing Sheets

(58) Field of Classification Search
USPC .................................................. 342/357.77
See application file for complete search history.

(56) References Cited

U.S. PATENT DOCUMENTS

| | | |
|---|---|---|
| 2007/0275658 A1 | 11/2007 | Gaal et al. |
| 2008/0273578 A1 | 11/2008 | Brenner et al. |
| 2008/0279260 A1 | 11/2008 | Yeh et al. |
| 2009/0207075 A1 | 8/2009 | Riley et al. |
| 2009/0213006 A1 | 8/2009 | Nayyar et al. |
| 2009/0224973 A1 | 9/2009 | Nayyar et al. |
| 2010/0208775 A1 | 8/2010 | Weill |
| 2010/0238976 A1 | 9/2010 | Young |
| 2010/0253578 A1 | 10/2010 | Mantovani |
| 2012/0050096 A1 | 3/2012 | Cheng et al. |
| 2013/0120188 A1 | 5/2013 | Pattabiraman et al. |
| 2013/0141277 A1 | 6/2013 | Hang et al. |
| 2014/0184442 A1 | 7/2014 | Large et al. |
| 2019/0219708 A1 | 7/2019 | Rubtsov et al. |
| 2020/0158881 A1 | 5/2020 | Anderson et al. |
| 2021/0132237 A1 | 5/2021 | Molina |

FOREIGN PATENT DOCUMENTS

| | | | | |
|---|---|---|---|---|
| CN | 101978285 A | | 2/2011 | |
| CN | 103149579 A | | 6/2013 | |
| CN | 206057579 U | * | 3/2017 | |
| CN | 111398996 A | | 7/2020 | |
| CN | 112400121 A | | 2/2021 | |
| CN | 113447967 A | | 9/2021 | |
| CN | 114624746 A | * | 6/2022 | ............. G01S 19/30 |

OTHER PUBLICATIONS

International Search Report and Written Opinion mailed Jun. 8, 2023 in connection with International Application No. PCT/RU2022/000263, filed Aug. 30, 2022, 7 pgs.

International Search Report and Written Opinion mailed May 25, 2023, in connection with International Application No. PCT/RU2022/000264, filed Aug. 30, 2022, 7 pgs.

First Office Action and Search Report mailed Oct. 1, 2025, in connection with Chinese Patent Application No. 2022800981700, 11 pgs. (including translation).

First Office Actiona and Search Report mailed Oct. 1, 2025, in connection with Chinese Patent Application No. 2022800987317, 14 pgs. (including translation).

* cited by examiner

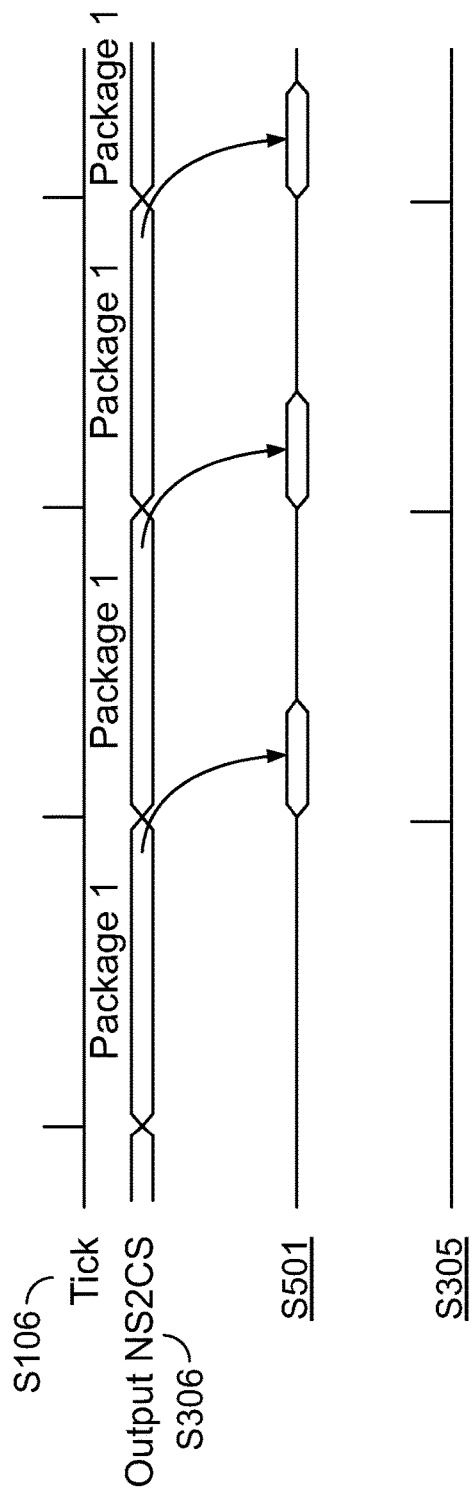
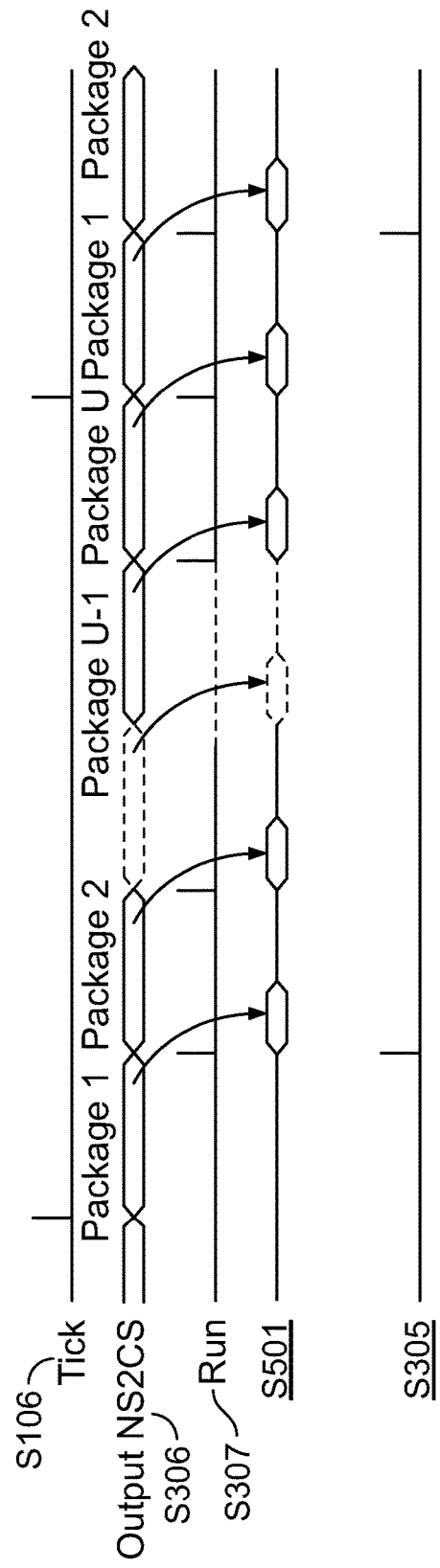
FIG. 4A
FIG. 4B

QUASI-ASYNCHRONOUS SAMPLING FREQUENCY GRID

CROSS-REFERENCE TO RELATED APPLICATION(S)

This application is a National Stage under 35 U.S.C. 371 of International Patent Application No. PCT/RU2022/000263, filed Aug. 30, 2022; the disclosure of which is incorporated herein by reference in its entirety.

FIELD OF THE INVENTION

The present disclosure relates generally to receivers, and, more particularly, to receivers for processing satellite navigation signals using a quasi-asynchronous sampling frequency grid.

BACKGROUND

A Global Navigation Satellite System (GNSS) receiver can obtain a navigation solution (i.e., positioning information) provided that the receiver has reliable signal reception from a number of GNSS satellites to which the receiver is in contact. Reliable signal reception it typically enabled only under certain operating conditions, that is, an open sky environment when there are no obstacles to radio signals propagating from selected navigation satellites to the receiver's antenna. Any antenna blockage by natural or artificial obstacles (e.g., high trees with dense foliage, vertical walls of buildings, bridges, urban canyons, and structural elements of moving vehicles with a mounted GNSS antenna, and so on) will deteriorate the quality of signal reception. As such, the accuracy of these navigation solutions may suffer greatly including a full loss of the ability to accurately provide GNSS positioning in any way. GNSS receivers must also have sufficient processing power to perform required operations in order to determine positioning information in a timely manner.

GNSS receivers typically process GNSS satellite signals in one clock cycle. Processing signals in one clock cycle requires significant processing power and memory storage. The amount of processing power and memory storage required results in the use of expensive components which drives up the cost of the GNSS receiver. What is needed is a receiver that can process GNSS satellite signals fast using inexpensive components.

SUMMARY

A navigation receiver includes a plurality of RF paths configured to receive Global Navigation Satellite System (GNSS) signals. A phase-locked loop is configured to generate a clock signal and a plurality of clock dividers are configured to receive the clock signal and divide the clock signal. Each of a plurality of navigation systems receive a clock signal from one of the plurality of clock dividers. Each of the plurality of navigation systems includes a plurality of analog to digital converters, each configured to receive a GNSS signal. Each of the plurality of navigation systems also includes a plurality of signal processors configured to process digitized signals, a plurality of decimators configured to decimate the digitized signals, a plurality of signal processors configured to process the decimated signals, a plurality of re-quantizers configured to convert the processed decimated signals into low-bit data, a plurality of navigation system to CPU System interface blocks (NS2CS) interface blocks configured to generate packages, a MUX interconnect configured to distribute data streams, and a time control unit configured to generate a tick signal. The navigation receiver also includes a CPU system including a memory, a multi-channel navigation Direct Memory Access (DMA), a plurality of hardware accelerators and a plurality of channels. The navigation receiver also includes a CPU configured to control the plurality of navigations systems and the CPU system and also configured to process data received from the plurality of channels.

BRIEF DESCRIPTION OF THE DRAWINGS

In the drawings, like numerals describe similar components in different Figures. Like numerals having different letter suffixes represent different instances of similar components and/or signals.

FIG. 4A shows a signal graph of an NS2CS interface block operating in a single package mode according to one embodiment;

FIG. 4B shows a signal graph of an NS2CS interface block operating in a multi packages mode according to an embodiment;

DETAILED DESCRIPTION

Figure 1:
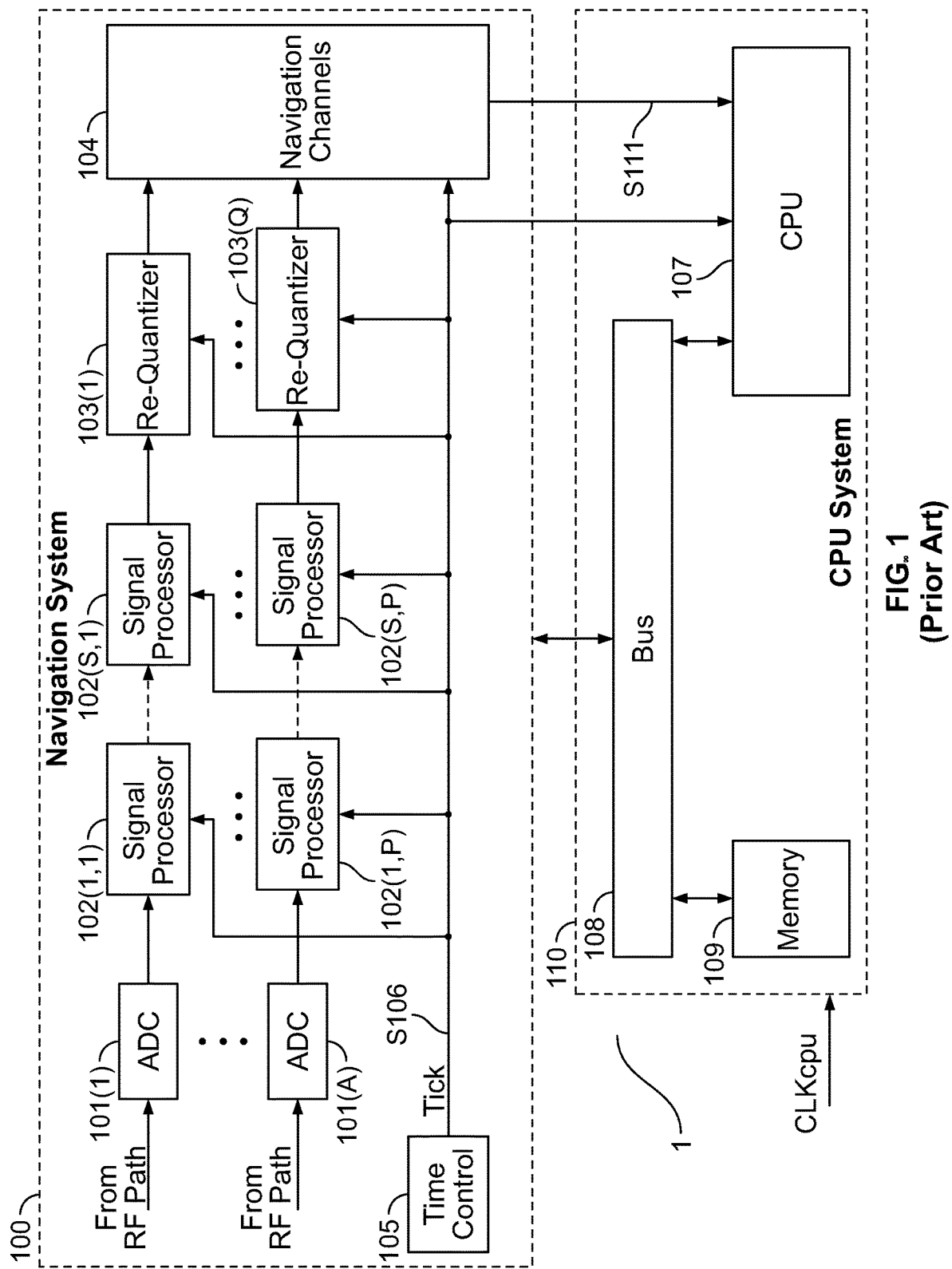
FIG. 1 shows a prior art Global Navigation Satellite System (GNSS) receiver.

FIG. 1 shows a schematic of components of a prior art navigation receiver 1 (e.g., a GNSS receiver) comprising navigation system 100 including "A" number of Analog Digital Converters (ADC) as shown by ADC 101(1) ... 101(A). ADCs 101(1) ... 101(A) will be referred to collectively as ADCs 101. Navigation system 100 also comprises a plurality of signal processors forming a plurality of signal paths. A signal path comprising "S" number of signal processors is shown by signal processors 102(1,1) . . . 102(S,1). There are "P" number of signal paths as shown by signal processors 102(1,P) . . . 102(S,P). As such, the first path is shown by signal processors 102(1,1) . . . 102(S,1) and the last path is shown by signal processors 102(1,P) . . . 102(S,P). The plurality of signal processors including signal processors 102(1,1) . . . 102(1,P) and signal processors 102(S,1) . . . 102(S,P) will be referred to collectively as signal processors 102. Navigation receiver 1 also comprises "Q" number of re-quantizers as shown by re-quantizers 103(1) . . . 103(Q). Re-quantizers 103(1) . . . 103(Q) will be referred to collectively as re-quantizers 103. Navigation receiver 1 shown in FIG. 1 also comprises navigation channels 104, time control 105 transmitting tick signal S106, and CPU system 110 which includes CPU 107, BUS 108, and memory 109, and which receives data readiness flag signal S111.

GNSS signals received by one or more antennas (not shown) are transmitted to one or more of the plurality of RF paths that are connected to the inputs of ADCs 101. The RF paths, in one embodiment, are configured to transmit the GNSS signals in a particular frequency range for digitization. In one embodiment, each of ADCs 101 receives signals from a respective one of a plurality of RF paths. In one embodiment, multiple or all ADCs 101 may receive signals from a single RF path. From the output of ADCs 101 the digitized signal is input to signal processors 102 which process the signal.

One or more components can be used as signal processors 102, for example, signal processors 102 can be filters, noise suppressors, equalizers, and/or decimators, etc.

The signals output from signal processors 102(S,1) . . . 102(S,P) are input to re-quantizers 103(1) . . . 103(Q) which re-quantize the received data into low-bit data. The low-bit data output from re-quantizers 103(1) . . . 103(Q) are input to navigation channels 104 which process the low-bit data.

Navigation channels 104 transmit data ready flag signal S111 to CPU 107. Data ready flag signal S111 indicates that data is ready in navigation channels 104.

Time control 105 generates tick signal S106, which, in one embodiment, is a time scale. The period of tick signal S106 is equal to a number of clocks cycles of CLKnav, which is set by CPU 107 before operation (described in detail below in conjunction with FIG. 6). CLKnav, in one embodiment, is set by CPU 107 before operation of navigation system 100 begins. Tick signal S106 is input to: signal processors 102, re-quantizers 103, navigation channels 104, and CPU 107. A CPU clock, referred to as CLKcpu (not shown), is input to CPU 107, BUS 108, and memory 109. A navigation clock, referred to as CLKnav (not shown), is input to 101, 102, 103, 104 and 105. Clocks CLKnav and CLKcpu are typically asynchronous, and the CLKcpu rate is generally substantially more than the CLKnav rate.

CPU 107, memory 109, and all components of navigation system 100 are each connected to BUS 108 which allows communication among CPU 107, memory 109, and all components of navigation system 100. In one embodiment, when tick signal S106 occurs, CPU 107 receives data via BUS 108 and controls navigation system 100 based on the received data. Memory 109 is used for data storage.

Figure 2A:
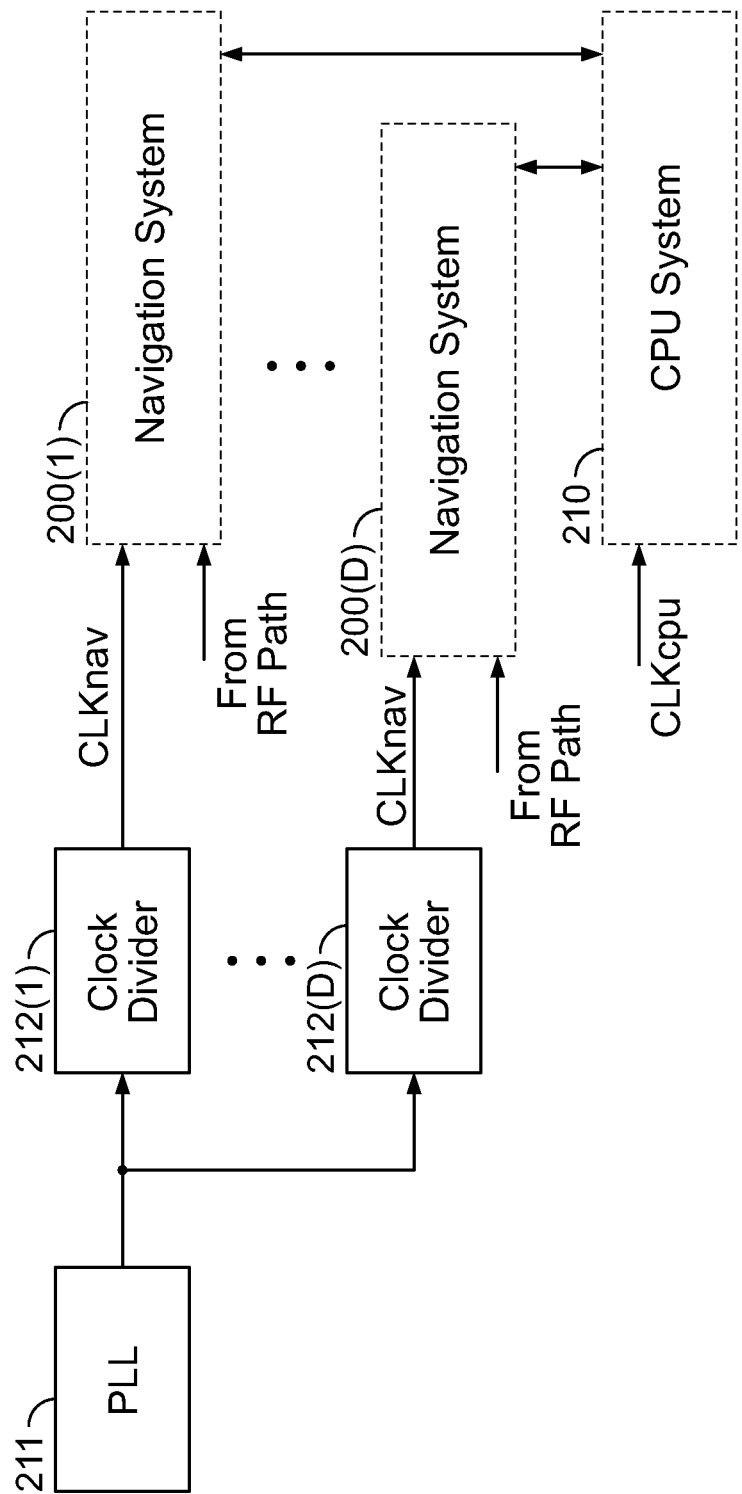
FIG. 2A shows a source clock for a GNSS receiver according to one embodiment.

FIG. 2A shows components of a source clock for a GNSS receiver comprising Phase-Locked Loop (PLL) 211 and "D" number of clock dividers 212(1) . . . 212(D) according to one embodiment. FIG. 2A shows "D" number of navigation systems 200(1) . . . 200(D), each of which is in communication with CPU system 210. PLL 211 is connected to each of "D" number of clock dividers 212(1) . . . 212(D). Navigation systems 200(1) . . . 200(D) are referred to collectively as navigation systems 200. Clock dividers 212(1) . . . 212(D) are referred to collectively as clock dividers 212.

In one embodiment, a GNSS receiver operates using a clock signal generated for use in navigation systems 200 and referred to as CLKnav. A clock signal output from PLL 211 is input to clock dividers 212. In each of clock dividers 212, different integer coefficients for dividing the input clock can be applied. Clock signals output from each of clock dividers 212 are input to a respective one of navigation systems 200. Clock signals output from clock dividers 212 are quasi-asynchronous, i.e., they are obtained from one clock signal (not shown) generated by PLL 211, but are divided by different integer coefficients.

Signals from one or more RF-paths that receive GNSS signals from one or more antennas (not shown) are input to navigation systems 200 for processing. Navigation systems 200 exchange data with CPU systems 210.

Figure 2B:
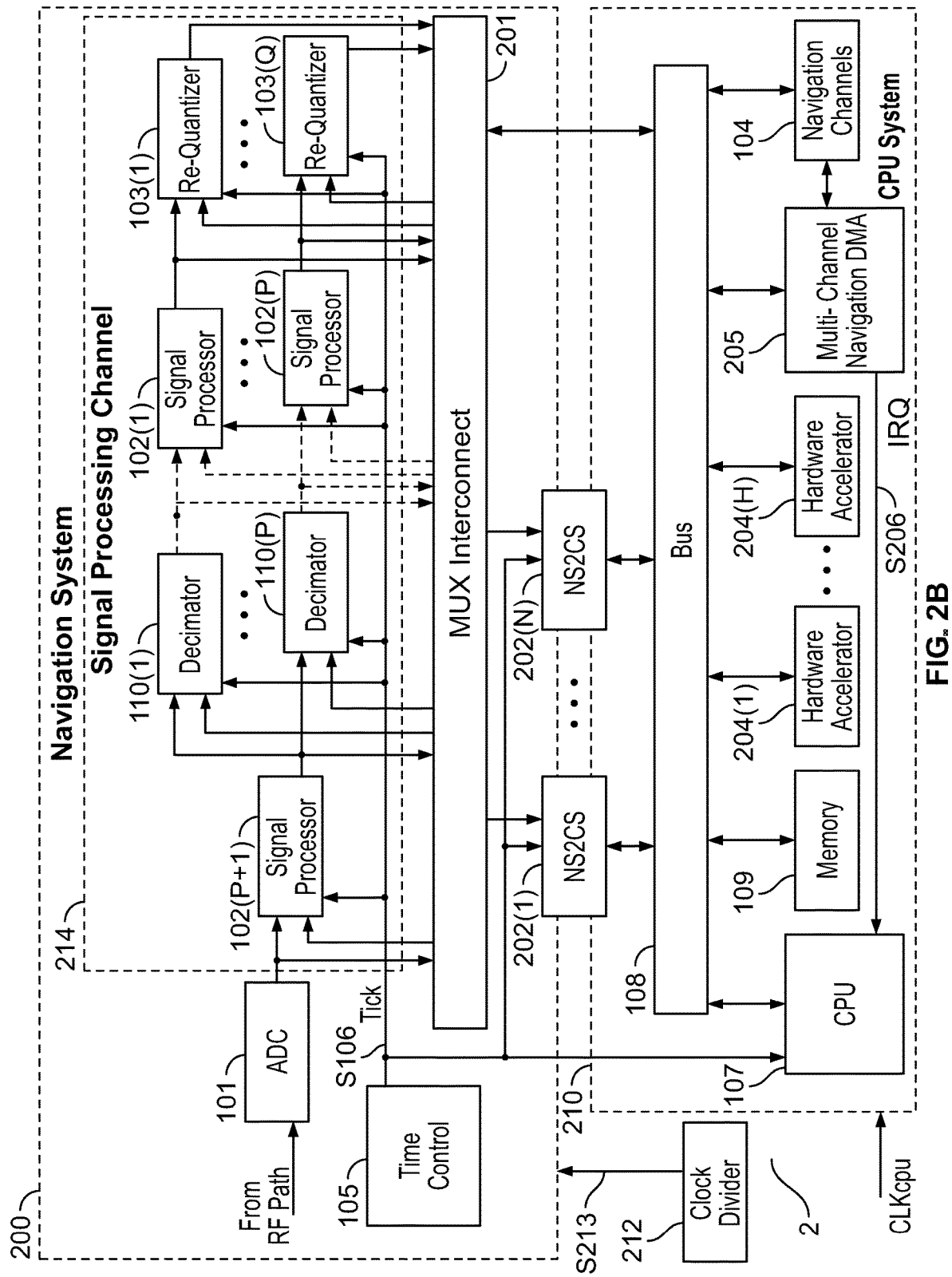
FIG. 2B shows a GNSS receiver according to one embodiment.

FIG. 2B shows components of GNSS receiver 2 according to one embodiment. FIG. 2B shows details of navigation systems 200(1) . . . 200(D) and CPU system 210 as navigation system 200 and CPU system 210. Navigation system 200 comprises signal processing channel 214 which is in communication with BUS 108 of CPU system 210 via MUX interconnect 201 and "N" number of navigation system to CPU system interface blocks (NS2CS) interface blocks 202(1) . . . 202(N). NS2CS interface blocks 202(1) . . . 202(N) are collectively referred to as NS2CS interface blocks 202.

Signal processing channel 214 includes "P+1" number of signal processors 102 which receive tick signal S106 from time control 105. One or more components can be used as signal processors 102, for example, signal processors 102 can be filters, noise suppressors, equalizers, and/or decimators, etc.) In signal processor 102(P+1), pre-processing takes place before decimation in 110. Signals output from signal processors (P+1) are input to "P" number of decimators 110(1) . . . 110(P). The output of each of decimators 110(1) . . . 110(P) is input to a respective one of "P" number of signal processors 102(1) . . . 102(P). The output of each of signal processors 102(1) . . . 102(P) is input to a respective one of "Q" number of re-quantizers 103(1) . . . 103(Q). The "P" number of decimators, "P" number of signal processors, and "Q" number of re-quantizers are collectively referred to as signal processors 102, decimators 110, and re-quantizers 103, respectively.

CPU system 210 comprises BUS 108 that is in communication with components of CPU system 210 and navigation systems 200(1) . . . 202(D). BUS 108 is in communication with "D" number of navigation systems 200(1) . . . 202(D), CPU 107, memory 109, "H" number of hardware accelerators 204(1) . . . 204(H), multi-channel navigation DMA 205, "N" number of NS2CS 202(1) . . . 202(N), and navigation channels 104. Hardware accelerators 204(1) . . . 204(H) are collectively referred to as hardware accelerators 204.

In one embodiment, navigation system 200 operates as follows. A clock signal, CLKnav S213, is output from clock divider 212. GNSS satellite signals are received by an antenna and transmitted through an RF-path to an input of ADC 101. From the ADC 101 output, the digitized signal enters the signal processor 102 (P+1) input where it is processed. Signal processor 102(P+1) outputs a signal that is input to decimators 110 where it is decimated. From the output of decimators 110, the signals are input to signal processors 102 where the signals are processed. Signals output from signal processors 102 are input to re-quantizers 103 where the signals are re-quantized into low-bit data.

In one embodiment, signal processing channel 214 (shown in FIG. 2B) can be replaced by a plurality of signal processing channels that process data in parallel. In one embodiment, Navigation system 200 can be replaced by a plurality of Navigation systems. In such an embodiment, each of the plurality of Navigation systems has its own tick signal S106 and tick signals S106 between Navigation Systems 200 are synchronous (i.e., they start at the same time, they have the same time duration, and each time they are generated at the same moment in time).

Signals output from decimators 110, re-quantizers 103, ADC 101, and signal processors 102 are input to MUX interconnect 201. From MUX interconnect 201, signals output from one or more of decimators 110, re-quantizers 103, ADC 101, and signal processors 102 can be input to any of NS2CS interface blocks 202 and further processed.

In one embodiment, time control 105 generates tick signal S106. Tick signal S106 is used for controlling components and is input to decimators 110, signal processors 102, re-quantizers 103, CPU 107, NS2CS interface blocks 202. In one embodiment, CPU 107 uses tick signal S106 to synchronize the control between decimators 110, signal processors 102, re-quantizers 103, NS2CS interface blocks 202.

The navigation clock signal (S213 CLKnav, shown output form clock divider 212 in FIG. 2B) and the CPU clock signal are asynchronous in one embodiment, with the CLKcpu frequency being much higher than the CLKnav frequency.

The CLKnav and CLKcpu clocks are generally asynchronous, and the CLKcpu frequency is substantially higher than the CLKnav frequency.

In one embodiment, the frequency of the CPU 107 is synchronous and much higher than CLKcpu. In another embodiment, the frequency of operation of hardware accelerators 204, 205 and 104 is synchronous and significantly higher than CLKcpu.

In one embodiment, CPU 107 can write data to memory 109 for storage via BUS 108. In one embodiment, CPU 107 can write data to hardware accelerators 204 for processing via BUS 108. The following units can be a source of data for package: ADC 101, signal processors 102, re-quantizers 103, decimators 110, hardware accelerators 204, NS2CS interface blocks 202, and CPU 107.

After processing at the output of re-quantizers 103 the number of samples over one time period can be different due to different decimation coefficients. The outputs of re-quantizers 103 with the same sample numbers over one time period can be collected in one stream and via MUX interconnect 201 they can be input to one NS2CS interface block 202 for further processing. After decimation at 110, subsequent data processing (in 102, 103, 202) is performed on the clock, which is synchronous and slower than the clock CLKnav.

In one embodiment, each of the outputs of re-quantizers 103 is directly connected to an input of any of NS2CS interface blocks 202. NS2CS interface blocks 202 can write data from navigation system 200 via BUS 108 to: memory 109, hardware accelerators 204, and CPU 107.

In one embodiment, hardware accelerators 204 can write the results of data processing via BUS 108 into: memory 109, a different one of hardware accelerators 204(1) . . . 204(H), and CPU 107.

Hardware accelerators 204 can be a Coarse-Grained Reconfigurable Architecture (CGRA) which may be built into an Application Specific Integrated Circuit (ASIC)), Field Programable Gate Array (FPGA), which may be embedded in an ASIC, a spectrum analyzer or other devices. When data is processed, hardware accelerators 204 generate an interrupt request (IRQ) that is transmitted to CPU 107 and a signal S707 (see FIG. 5) is transmitted to multi-channel navigation DMA 205.

Multi-channel navigation DMA 205 reads data from memory 109 via BUS 108. multi-channel navigation DMA 205 transmits data from memory 109 to navigation channels 104, where they are processed. After completion of operation multi-channel navigation DMA 205 outputs IRQ signal S206 to CPU 107. Multi-channel navigation DMA 205 can retrieve data from several memory areas at the same time.

CPU 107, using tick signal S106 and IRQs (e.g., IRQ S206) from multi-channel navigation DMA 205, NS2CS interface blocks 202, and hardware accelerators 204, controls data streams between: multi-channel navigation DMA 205, NS2CS interface blocks 202, and hardware accelerators 204.

Figure 2C:
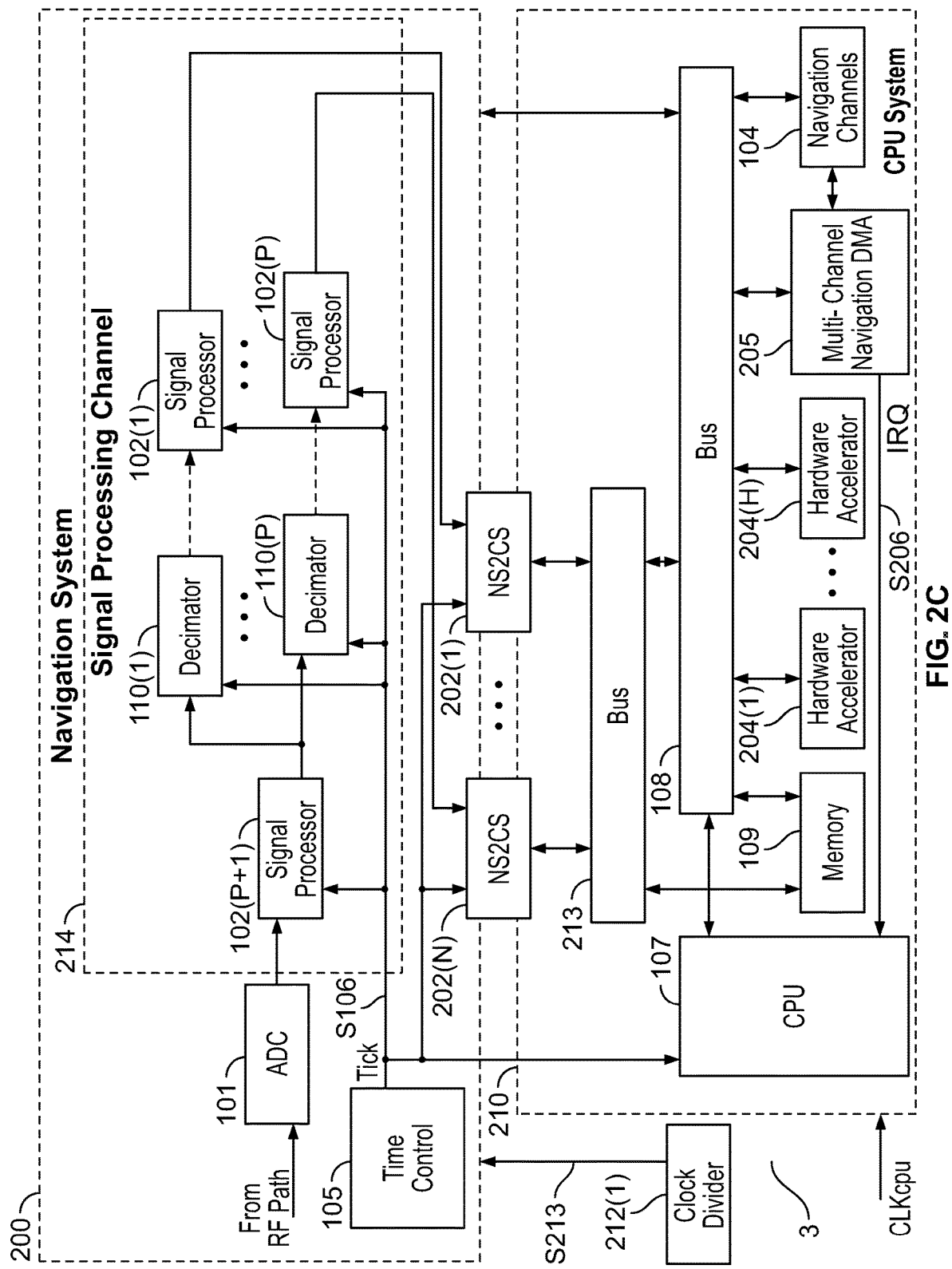
FIG. 2C shows a GNSS receiver according to one embodiment.

FIG. 2C shows components of a GNSS receiver 3 according to one embodiment. The components of GNSS receiver 3 shown in FIG. 2C are similar to the components of GNSS receiver 2 shown in FIG. 2B although some components are not shown for clarity and a new component has been added. BUS 213 is shown in communication with NS2CS interface blocks 202, BUS 108, and memory 109. In one of embodiment, the GNSS signals passing through an antenna and the RF-path are input to ADC 101. From the output of the ADC 101, the digitized signal is input to signal processor 102 (P+1) where it is processed. From the output of signal processor 102(P+1), the signal is input to decimators 110 where they are processed. From the output of decimators 110, the signals are input to signal processors 102 where they are processed.

From the output of signal processors 102 the signals are input to NS2CS interface blocks 202 where they are further processed. From the outputs of NS2CS interface blocks 202 the data is directly written to memory 109 via BUS 213 or to hardware accelerators 204 via BUS 108, or to CPU 107 via BUS 108.

In one embodiment, interface block NS2CS 202 performs data pre-processing. Interface block NS2CS 202 converts data into the required format for multi-channel navigation DMA 205, CPU 107, memory 109 and hardware accelerators 204 (shown in FIGS. 2B and 2C). The output data stream from interface block NS2CS 202 is a package.

Figure 3:
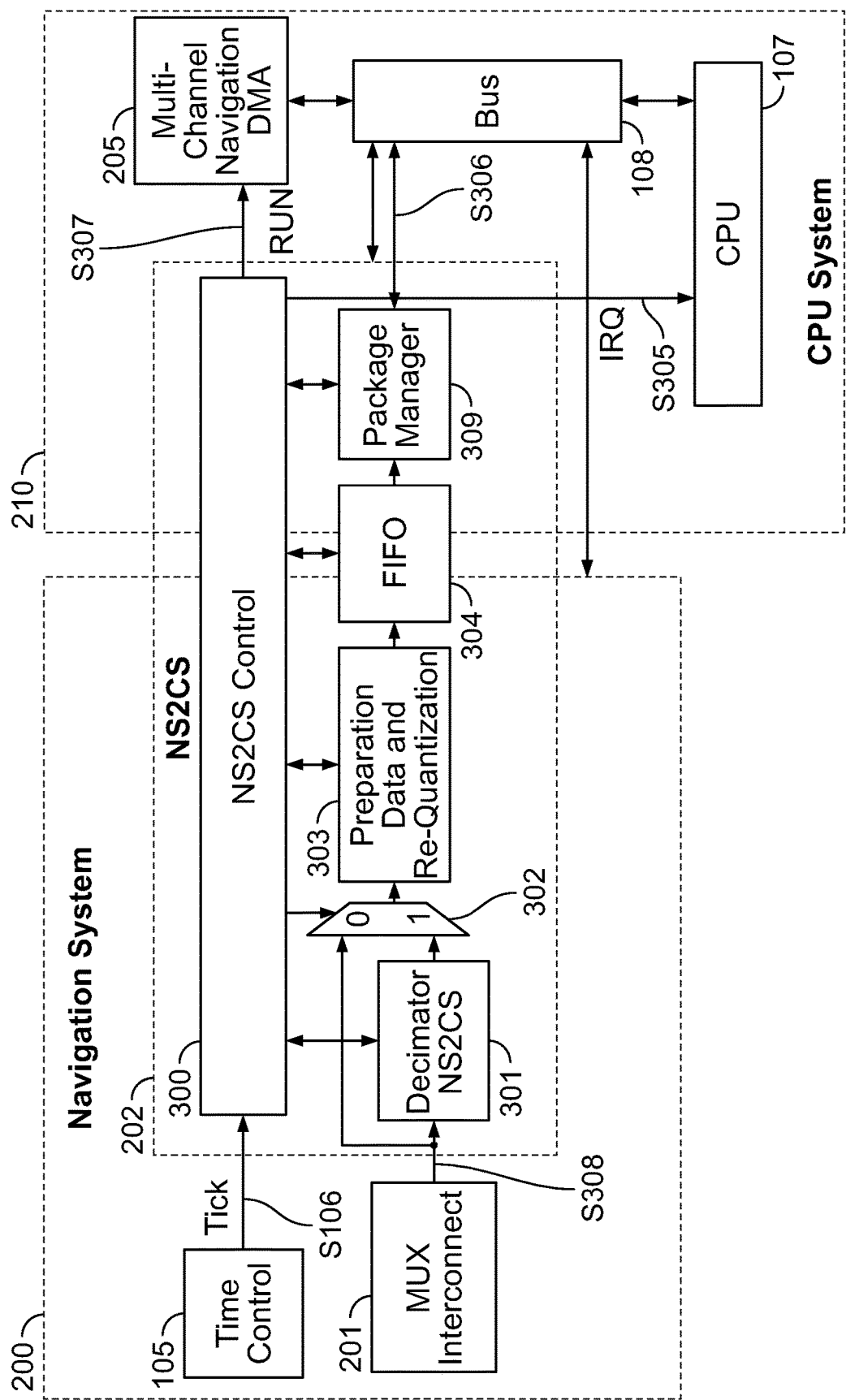
FIG. 3 shows a navigation system in communication with a CPU system via an NS2CS interface block according to one embodiment.

FIG. 3 shows navigation system 200 in communication with CPU system 210 via interface block NS2CS 202 according to one embodiment.

Interface block NS2CS 202, in one embodiment, comprises NS2CS control 300 which receives tick signal S106 from time control 105. NS2CS control 300 is in communication with decimator NS2CS 301. Decimator NS2CS 301 and MUX interconnect 201 transmit signals to multiplexer 302 which is in communication with NS2CS control 300. MUX interconnect 201 transmits continuous data stream S308 to multiplexer 302 and to decimator NS2CS 301. Signals output from multiplexer 302 are transmitted to preparation data and re-quantizer 303 which is in communication with NS2CS control 300. Preparation data and re-quantizer 303 transmits signals to asynchronous asymmetric first in first out (FIFO) buffer 304 (also referred to as FIFO 304) which is in communication with NS2CS control 300. Asynchronous asymmetric FIFO buffer 304 transmits signals to package manager 309 which is in communication with NS2CS control 300. Package manager 309 is in communication with BUS 108. BUS 108 is in communication with CPU 107 and multi-channel navigation Direct Memory Access (DMA) 205. Multi-channel navigation DMA 205 also receives RUN signal S307 from NS2CS control 300.

Continuous data stream signal S308 from MUX Interconnect 201 is input to decimator NS2CS 301, if needed, and the signal is decimated with different decimation coefficients. A signal output from decimator NS2CS 301 is input to preparation data and re-quantizer 303 via multiplexer 302.

Preparation data and re-quantizer 303 prepares data and, if needed, re-quantizes data in low-bit data.

If decimation is not used, then continuous data stream signal S308 from MUX Interconnect 201 is input to multiplexer 302 and is then transmitted to preparation data and re-quantizer 303.

Data output from preparation data and re-quantizer 303 is input to asynchronous asymmetric FIFO buffer 304. The output of asynchronous asymmetric FIFO buffer 304 is then input to package manager 309, where the data is converted into a package with the given sample number.

In one embodiment, before starting operation, NS2CS control 300 configures: decimator NS2CS 301 (if necessary), multiplexer 302, preparation data and re-quantizer 303, asynchronous asymmetric FIFO buffer 304, and package manager 309. In one embodiment, decimation used to reduce amount samples in package, without loss of signal quality in further processing.

In one embodiment, a package is the number of samples assigned/set by CPU 107. Samples are data over one clock cycle CLKnav. Interface block NS2CS 202 starts to generate a package according to tick signal S106. In one embodiment, interface block NS2CS 202 generates a package and puts it in memory 109 (shown in FIGS. 2B and 2C).

In one embodiment, data in a package can be processed in: navigation channels 104 (shown in FIGS. 2B and 2C) using multi-channel navigation DMA 205, CPU 107, and/or hardware accelerators 204.

In one embodiment, a package can be generated by: CPU 107, interface block NS2CS 202, and/or hardware accelerators 204.

In one embodiment, asynchronous asymmetric FIFO buffer 304 re-synchronizes data from clock CLKnav to clock CLKcpu.

In one embodiment, during operation, interface block NS2CS 202 stacks data at given addresses and generates an interrupt request signal S305 for CPU 107. If necessary, data is written cyclically. In another embodiment, decimator NS2CS 301 is removed to reduce interface block NS2CS 202 space required on the ASIC.

Interface block NS2CS 202 operates in two modes: single package mode and multi packages mode.

Figure 7:
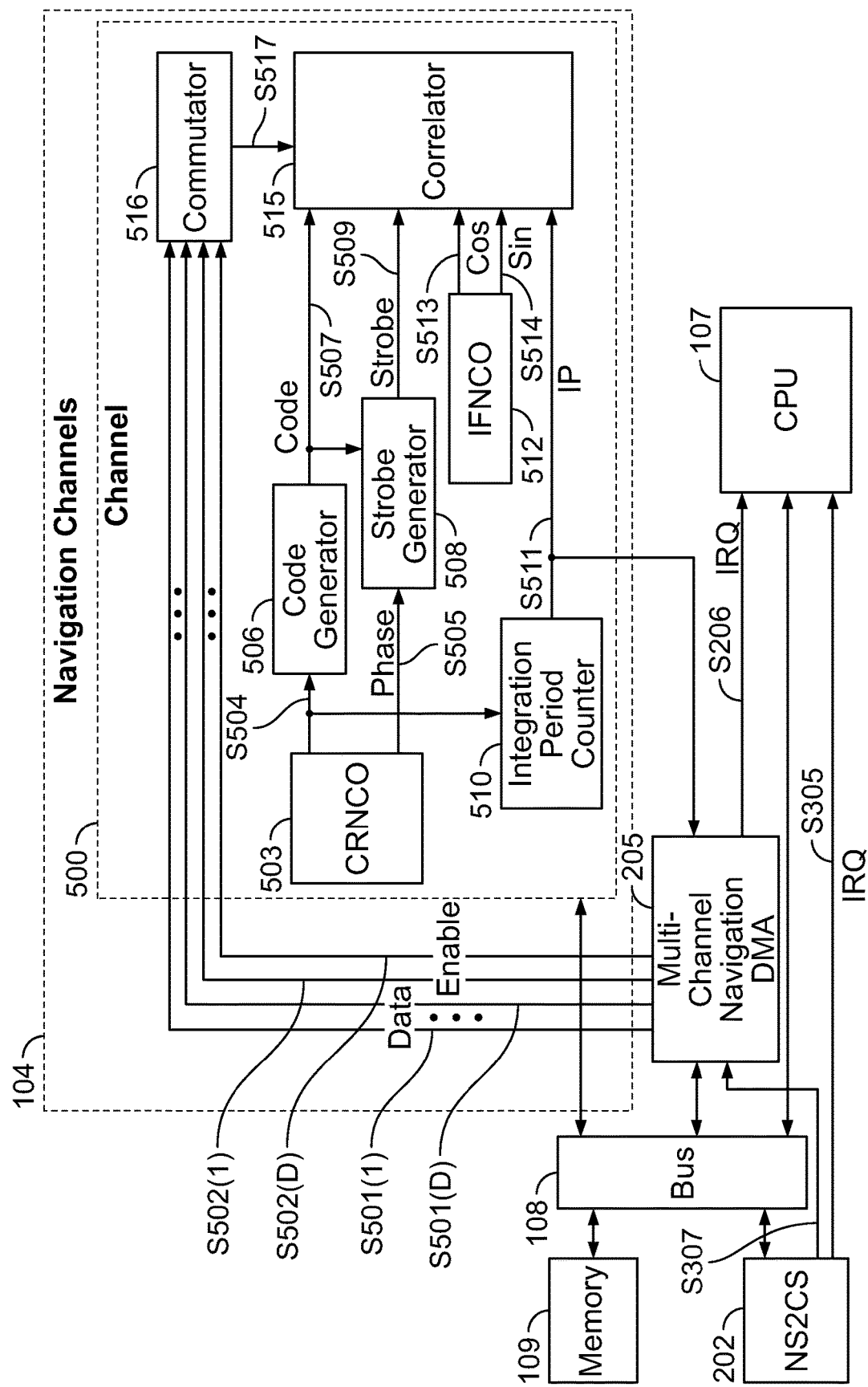
FIG. 7 shows navigation channels in communication with a multi-channel navigation Direct Memory Access (DMA) according to one embodiment.

FIG. 4A shows a signal graph of interface block NS2CS 202 operating in single package mode. During one tick period signal S106 one package is formed. When the package is formed, IRQ signal S305 is generated and input to CPU 107. In this mode, CPU 107 has control of data stream using tick signal S106 and IRQ signals from interface block NS2CS 202 and hardware accelerators 204, 205. In one embodiment, multi-channel navigation DMA 205 forms multi-bit data signal S501 and enabling signal S502 (see FIG. 7) for navigation channels 104.

FIG. 4B shows a signal graph of interface block NS2CS 202 operating in multi packages mode. Time control 105 generates tick signal S106, according to which data processing starts. During one period of tick signal S106, U packages are formed. When the first package had been formed and has been written to memory 109, signal S305 is generated. After completion of each package RUN signal S307 is generated. In one embodiment, packages 1 . . . U have the same size.

In another embodiment, packages 1 . . . U have different sizes. Multi-channel navigation DMA 205 reads a package from memory 109 and forms multi-bit data signals S501 and S502 for navigation channels 104, based on signal S307. When necessary, an additional operation with respect to a package is performed, specifically, any time after writing a package to memory 109, interface block NS2CS generates the S305 and S307 signals.

Figure 5:
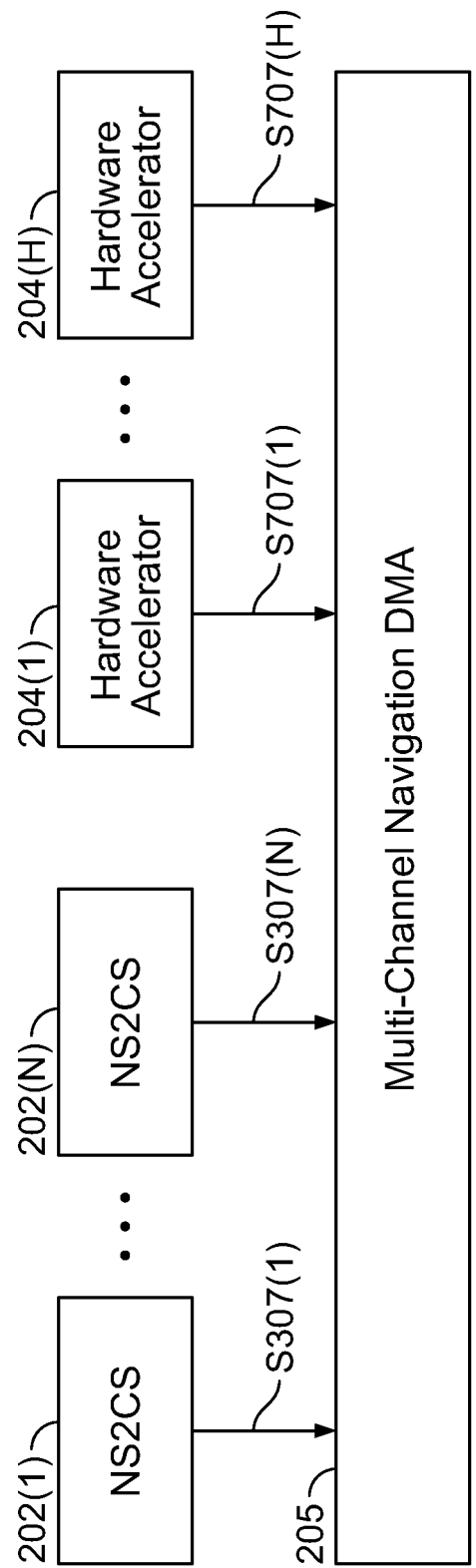
FIG. 5 shows signals received by a multi-channel navigation Direct Memory Access (DMA) according to an embodiment.

FIG. 5 shows signals received by multi-channel navigation DMA 205. Signals received by multi-channel navigation DMA 205 include "N" number of signals from the output of interface blocks NS2CS 202(1) . . . 202 (N) as shown by signals S307(1) . . . S307(N). Signals received by multi-channel navigation DMA 205 also include "H" number of RUN signals as shown by RUN signals S707(1) . . . S707(H) from the output of "H" number of hardware accelerators as shown by hardware accelerators 204(1) . . . 204(H), respectively. The signals received by multi-channel navigation DMA as described are used in a first-try automatic mode.

In one embodiment, signals S707 are received at multi-channel navigation DMA 205 from hardware accelerators 204. Signals S707 are transmitted at the end of writing a package into memory 109 (see FIGS. 2B and 2C). Signals S707 are used by multi-channel navigation DMA 205 in a manner similar to signals S307, and also in the First-try automatic mode.

Multi-channel navigation DMA 205, using signals S307 and S707, reads packages from memory 109 and generates signals S501 and S502 (see FIGS. 4A, 4B and 8) at the same time from different data sources NS2CS interface blocks 202 and/or hardware accelerators 204.

In navigation system 200 (as shown in FIGS. 2B and 2C), the signal is decimated by one of decimators 110.

Figure 6:
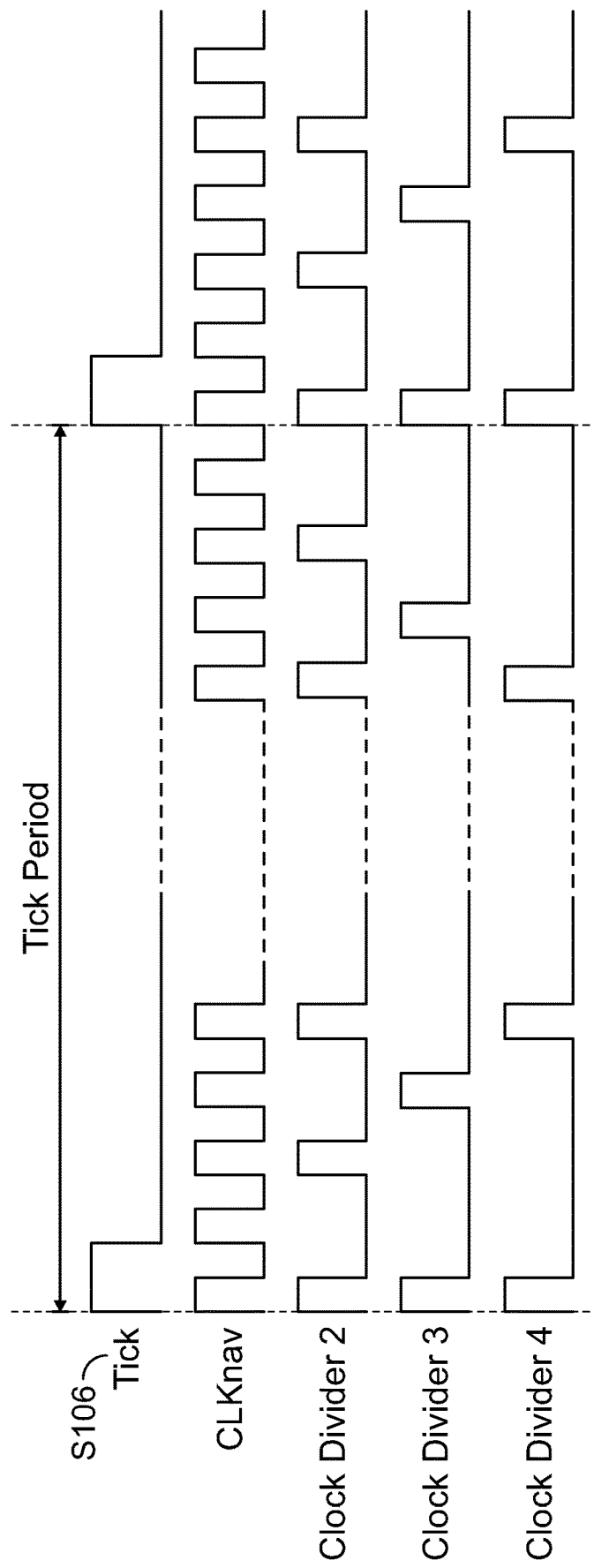
FIG. 6 shows a clock generating a clock signal according to one embodiment.

FIG. 6 shows one of several possible variants for a clock generating a clock signal referred to as a Clock for Decimation. Tick signal S106 has a particular tick period. Tick signal S106 consists of multiple ClkNav. Clock divider 2 signal shows Clknav pulses divided by 2. Similarly, Clock Divider 3 signal shows Clknav clock divided by 3 and Clock Divider 4 signal shows Clknav clock divided by 4. In one embodiment, a signal is input to signal processor 102 (which is a Decimator in this variant) to control decimation. In one embodiment, tick signal S106 is used for all components (for all clocks divide) at the same time (for all decimation coefficients).

When using decimation, the number of samples at the input of interface block NS2CS 202 is reduced, which reduces the size of packages. In one embodiment, the NS2CS interface blocks convert the received digitized signal into a package having a pre-set or designated size.

FIG. 8 shows navigation channels in communication with the NS2CS CPU system 210 of FIG. 5 according to an embodiment. As shown in FIG. 8, navigation channels 104, in one embodiment, includes at least one channel 500. Channel 500 receives "D" number of signals as shown by signals S501(1) . . . S501 (D) and S502(1) . . . S502 (D) from multi-channel navigation DMA 205 and comprises code rate NCO (CRNCO) 503, code generator 506, strobe generator 508, integration period counter 510, Intermediate Frequency NCO (IFNCO) 512, correlator 515, and commutator 516. Signals that are transmitted and/or received include code rate signal S504, code phase signal S505, code signal S507, strobe signal S509, integration period (IP) signal S511, cosine signal S513, sin signal S514, and output signal from commutator S517.

In one embodiment, navigation channels 104 consists of multiple channels. FIG. 8 shows channel 500 which is one of the multiple channels. In one embodiment, a package can contain data from one or more data sources. Data from different sources can be combined in one package over a time period with the same number of samples. Low-bit data received from the outputs of different re-quantizers 103 (shown in FIG. 2B) is multiplexed in a single multi-digit word and input to an allocated interface block NS2CS 202 to generate a common package which is transmitted to memory 109 where it is saved. Multi-channel navigation DMA 205 reads the package from memory 109 and converts data from re-quantizers 103(1) ... 103(Q) (shown in FIG. 2B) into "D" number of signals as shown by signals S501(1) ... S501(D) and enabling signal S502(1) ... S502(D). Data from each of re-quantizers 103(1) ... 103(Q) is transmitted as signals S501(1) ... S501(D), respectively. Signals S501(1 ... D) and S502(1 ... D) are fed from 205 to the input of Commutator 516. Signals S501(1) and S502(1) are used at the same time. Signals S501(D) and S502(D) are used simultaneously. CPU 107 with the help of Commutator 516 connects Channel 500 to needed signal S501 (*i*) and S502(*i*). Here, «i» is any number from 1 ... D. When signal S502(*i*) is active, processing of data S501 (*i*) in Channel 500 is enabled. When signal S502(*i*) is inactive and processing of S501 (*i*) in Channel 500 stops.

In one embodiment, multi-channel navigation DMA 205 sends one package to navigation channels 104 during generation of the next package. In one embodiment, multi-channel navigation DMA 205 parallel operates several packages and transmits to navigation channels 104 during generation of the next package. CPU 107 via BUS 108 controls multi-channel navigation DMA 205. Before operation, CPU 107 adjusts multi-channel navigation DMA 205 to operate in one of several modes.

Multi-channel navigation DMA 205 can operate in the following modes: CPU fully controlled mode and first-try automatic mode.

In the CPU fully controlled mode according to one embodiment, CPU 107 controls multi-channel navigation DMA 205 and channel 500. In one embodiment, the CPU fully controlled mode is only used when interface block NS2CS 202 operates in single package mode. Time control 105 generates tick signal S106, which sets the amount at which data is processed. Interface block NS2CS 202 operates in single package mode. When a package is formed, signal S305 is generated. According to signal S305, CPU 107 writes a control command in navigation channels 104 and then, according to a command from CPU 107, multi-channel navigation DMA 205 sends the package (or packages). When the package (or packages) is sent, multi-channel navigation DMA 205 generates signal S206. CPU 107 reads data from navigation channels 104 based on signal S206 An advantage of this mode is a more flexible chain of data processing, since CPU 107 can itself determine to which block it will send data.

In the first-try automatic mode according to one embodiment, CPU 107 controls 205 and channels 500, multi-channel navigation DMA 205 itself using signals S307 (Shown in FIGS. 7, 5) and S707 (shown in FIG. 5) sends packages to channels 500. In one embodiment, the first-try automatic mode is used only when interface block NS2CS 202 operates in multi packages mode. Time control 105 generates tick signal S106, which sets the amount at which data is processed. After the first package is completely sent, signal S305 is generated. CPU 107, according to signal S305, sends a control command to navigation channels 104, and further, on CPU command, multi-channel navigation DMA 205 sends the package. At the end of each package, according to RUN signal S307, multi-channel navigation DMA 205 is run and the package is sent to navigation channels 104. After the last package, based on current tick signal S106, multi-channel navigation DMA 205 generates signal S206. CPU 107 according to signal S206 reads data from navigation channels 104. An advantage of this mode is that the smaller packages require less memory. In addition, power consumption is less because this mode required less control form the CPU.

When a package is complete, multi-channel navigation DMA 205 reads it from memory 109 and generates multi-bit data signal S501 and enabling signal S502. When data signal S501(1) is sent via commutator 516 and active S502(1), a S501(1) is sent and process to current channel 500. When data S501(D) is sent via commutator 516 and active S502(D), a S501(D) is sent and process to current channels 500. Multi-channel navigation DMA 205 reads the package (packages) from memory 109 and converts data into signals S501 and enabling signal S502.

Multi-channel navigation DMA 205 in the CPU fully controlled mode generates IRQ signal S206 at the end of the package, after data is sent to channels 500, that corresponds to the period of tick signal S106.

Multi-channel navigation DMA 205 in the First-try automatic mode generates IRQ signal S206 one time for some packages, when data transmission to channels 500 is over, and IRQ signal S206 corresponds to the period of tick signal S106.

Signals S501(1) ... S501(D) and S502(1) ... S502(D) are transmitted from multi-channel navigation DMA 205 to the input of commutator 516. CPU 107, in conjunction with commutator 516, connects channel 500 to signals S501(*i*) and S502(*i*), where i is any number from 1 to D.

While multi-channel navigation DMA 205 is reading a package from memory 109, if signal S502 indicates that there is not enough or sufficient time to prepare the next data or S501 is finished, channels 500 stops data processing for this period of time.

Navigation Channels 104 consists of a set of channels 500. CPU 107 controls and retrieves data from channels 500 via BUS 108. In channels 500, each sample from a package is processed in one clock CLKcpu.

In one embodiment, the period of tick signal S106 is smaller than the period of integration period signal S511.

A configuration of channel 500 is a group of settings defined for the selected processing mode of the GNSS signal. For example, the parameters are selected signal S501(*i*) and S502(*i*) in 516; and the configuration of code generator 506.

In one embodiment, CPU 107 configures, controls, and retrieves data from channel 500 when multi-channel navigation DMA 205 does not send data signal S501. Before operation, CPU 107 sets the current configuration of components and parameters of channel 500 as follows: code frequency and initial code phase in code rate NCO 503, code generator 506, strobe generator 508, duration of integration period signal S511 in integration period counter 510, intermediate frequency and initial code phase in intermediate frequency NCO 512, and commutator 516. In one embodiment, the multi-channel navigation DMA fixes the data readiness in the plurality of channels based on an integration period signal, and the CPU reads them after data processing.

In one embodiment, channel 500 processes input signals S501(*i*) from the beginning to the end of a package.

CRNCO 503 generates code frequency signal S504 which is input to code generator 506 and integration period counter 510. Code generator 506 generates code signal S507 at the rate of signal S504. Code signal S507 is input to strobe generator 508 and correlator 515. CRNCO 503 generates code phase signal S505 which is input to strobe generator 508. Strobe generator 508 using signals S507 and S505 generates strobe signal S509 which is input to Correlator 515. IFNCO 512 generates signals Cosine (Cos) S513 and Sin S514 having intermediate frequency. Signals S513 and S514 are input to correlator 515. From commutator 516, signal S517 is input to correlator 515. Integration period counter 510 generates integration period signal S511 based on code rate signal S504. Integration period signal S511 is input to correlator 515 and multi-channel navigation DMA 205. In one embodiment, signal S517 is signal S501 (i).

In correlator 515, signal S517 is multiplied by Cos signal S513 and code signal S507 and the result of the multiplication is accumulated over integration period signal S511. According to integration period signal S511, the accumulated value is saved in buffer register 1 (component I shown below), and CPU 107, if needed, takes this value, and the accumulated value is zeroed.

$$I = \sum_{1}^{IP} S517 * S513 * S507$$

In correlator 515, signal S517 is multiplied by Sin signal S514 and code signal S507 and the result of the multiplication is accumulated over integration period signal S511. According to signal S511, the accumulated value is saved in buffer register 2 (component Q shown below), and CPU 107, if needed, takes this value, and the accumulated value is zeroed.

$$Q = \sum_{1}^{IP} S517 * S514 * S507$$

In correlator 515, signal S517 is multiplied by signal Cos S513 and strobe signal S509 and the result of the multiplication is accumulated over integration period signal S511. According to signal S511 the accumulated value is saved in buffer register 3 (component dI shown below), and CPU 107, if needed, takes this value, and the accumulated value is zeroed.

$$dI = \sum_{1}^{IP} S517 * S513 * S509$$

In correlator 515, signal S517 is multiplied by Sin signal S514 and strobe signal S509 and the result of the multiplication is accumulated over integration period signal S511. According to signal S511 the accumulated value is saved in buffer register 4 (component dQ shown below), and CPU 107, if needed, takes this value, and the accumulated value is zeroed.

$$dQ = \sum_{1}^{IP} S517 * S514 * S509$$

Based on signal S206, CPU 107, if signal S511 in multi-channel navigation DMA 205 is available, reads ready data from channel 500 including values from buffer registers 1 through 4 (components I, Q, dI, dQ). Note that it is also possible to read code phase CRNCO 503, intermediate frequency phase in IFNCO 512 and the state of integration period counter 510 and so on.

Before processing according to signal S501(i) CPU 107 can control/modify parameters of channel 500, including changing code frequency in CRNCO 503, setting code phase shift in CRNCO 503, changing intermediate frequency in IFNCO 512, setting intermediate frequency phase shift in IFNCO 512

Operation of strobe generator 508 is described in U.S. Pat. No. 7,764,226 B1, the disclosure of which is incorporated herein by reference in its entirety.

Figure 8A:
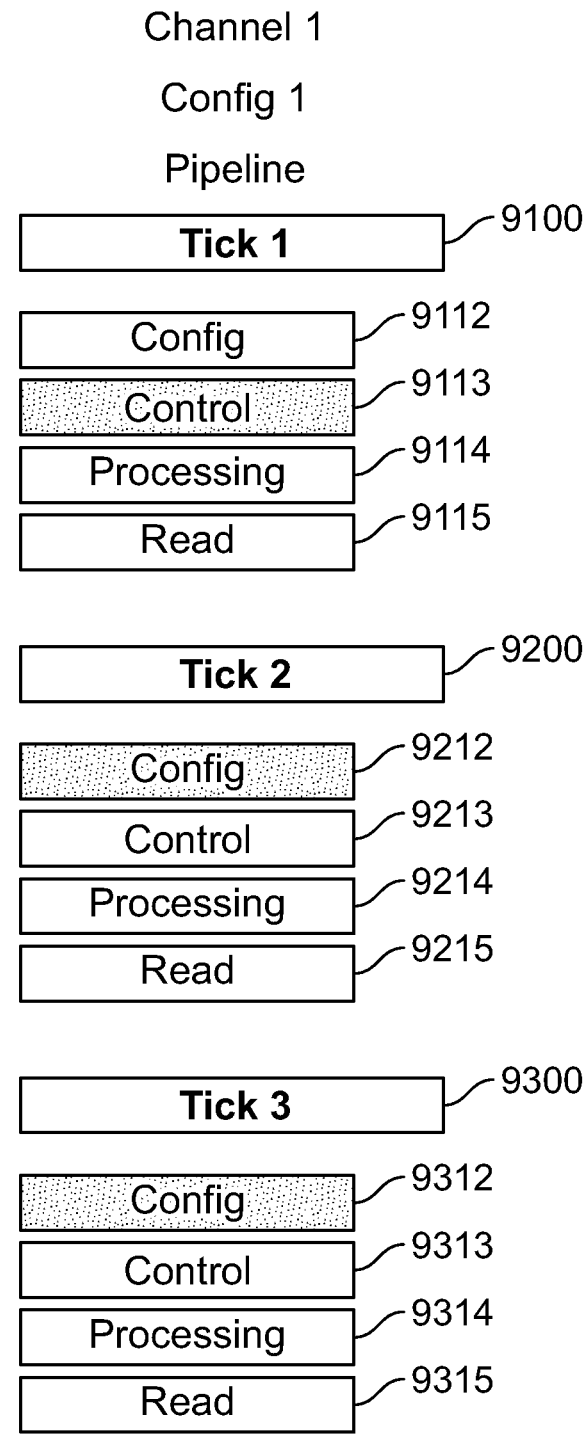
FIG. 8A shows package processing steps according to one embodiment.

FIG. 8A shows package processing steps which are described as follows.

Signals S305, S307 and S707 indicate to multi-channel navigation DMA 205 that there is a new package in memory 109. CPU 107, using a combination of signals S106, S206, S305, S307, S707 controls GNSS signals processed in channels 500. Package processing with multi-channel navigation DMA 205 includes the following steps. The table below describes package processing steps. The designation column of the table indicates that the last digit of the labels of FIG. 9A are associated with a particular step (i.e., labels 9112, 9212, and 9312 are each associated with the configuration step, labels 9113, 9213, and 9313 are each associated with the control step, etc.)

| Step | Designation | Description |
| --- | --- | --- |
| Config | ***2 | Channel 500 is prepared to process a GNSS signal, a new current configuration of Channel 500 is set Or previously run GNSS signal processing is stopped. |
| Control | ***3 | A control command is sent to Channel 500. |
| Processing | ***4 | Channel 500 processes S501(i) if active S502(i) |
| Read | ***5 | Ready data is taken from Channel 500, further processed. |

In one embodiment, during the formation of a new package, all the steps required for each current configuration must be completed.

In CPU fully controlled mode configuration and control steps are controlled by CPU 107. During the configuration and control steps, the CPU 107 controls channel 500 before sending a package to channel 500. The read step is controlled by CPU 107. At the read step, the CPU 107 reads the ready data from the channel 500, after processing a package in channel 500. Multi-channel navigation DMA 205 generates IRQ signal S206 after processing a package (after the processing step).

In first-try automatic mode, configuration and control steps are controlled by CPU 107. CPU 107, during configuration and control steps, controls channel 500, before the first package formed over tick signal S106 is sent to channel 500. The read step is controlled by CPU 107. In the read step, the CPU 107 reads the ready data from the channel 500 after channel 500 has processed the last package generated during the tick signal S106 period. Multi-channel navigation DMA 205 generates IRQ signal S206, after processing, in channel 500, the last package (after the processing step) generated during the tick signal S106 period.

In one embodiment, the following steps are performed in the sequence as shown:

Configuration Step

For a plurality of channels 500, configuration steps (e.g., steps 9\*\*2 shown in FIG. 8A) can be used one after another. If it is needed to run a new GNSS signal processing, channels 500 is set to a new configuration. Channels 500 can also stop GNSS signal processing if needed.

Control Step

For a plurality of channels 500, control steps (e.g., steps 9\*\*3 shown in FIG. 8A) are used one after another. If needed, control commands are sent to channel 500.

Processing Step

Processing steps (e.g., steps 9\*\*4 shown in FIG. 8A) are applied for all channels 500 at the same time (in parallel). Packages (represented by signal S501) are sent to all channels 500 simultaneously. Each Channel 500 processes its own package received as signal S501 (*i*).

Read Step

If needed, for a plurality of channels 500, read steps (e.g., steps 9\*\*5 shown in FIG. 8A) are used sequentially. If signal S511 is available in multi-channel navigation DMA 205, ready data is read CPU 107 from channels 500.

In one embodiment, CPU 107 can, if necessary, read data from channels 500 without using multi-channel navigation DMA 205, temporarily stopping the operation of 205 after signal S206.

In one embodiment, channels 500 do not process previously configured current configurations and CPU 107 will not set one or more new current configurations of channels 500, then multi-channel navigation DMA 205 does not send a package (i.e., multi-channel navigation DMA 205 skips all steps) to channels 500 and generates signal S206.

The use of CPU 107 for steps Config and Control in the modes CPU fully controlled and first-try automatic guarantees the synchronicity of control for all channels 500.

In FIG. 8A, steps having shaded backgrounds are not active (i.e., not used). In one embodiment, the time of package generating is equal to the period of tick signal S106 (see FIG. 4A).

In one embodiment, channel 500(1), in its current configuration, Config 1, processes signal S501 (*i*). In the Config 1 configuration, data packages are processed in the same way as they are in operation of channel 500 in the typical GNSS receiver (shown in FIG. 1) in a pipeline mode.

The Config 1 configuration, in one embodiment, is carried out in the following way: At Tick 1 9100—the current configuration is set, the GNSS signal is processed, and, if needed, data is read; and at Tick 2 9200 and at Tick 3 9300—GNSS signal processing continues, and, if needed, data is read.

In FIG. 8A the steps are carried out in the following sequence:

Once tick signal S106 number 1 (i.e., Tick 1 9100) has occurred, the following steps are performed: Config 9112 sets Config 1; Processing 9114; and Read 9115.

Once tick signal S106 number 2 (i.e., Tick 2 9200) has occurred, the following steps are performed: Control 9213 for Config 1; Processing 9214; and Read 9215.

Once tick signal S106 number 3 (i.e., Tick 3 9300) has occurred, the following steps are performed: Control 9313 for Config 1; Processing 9314; and CPU Read 9315.

It should be noted that, in one embodiment, in single GNSS signal processing mode—Channels 500 always operates in the current configuration which corresponds to Config 1.

Figure 8B:
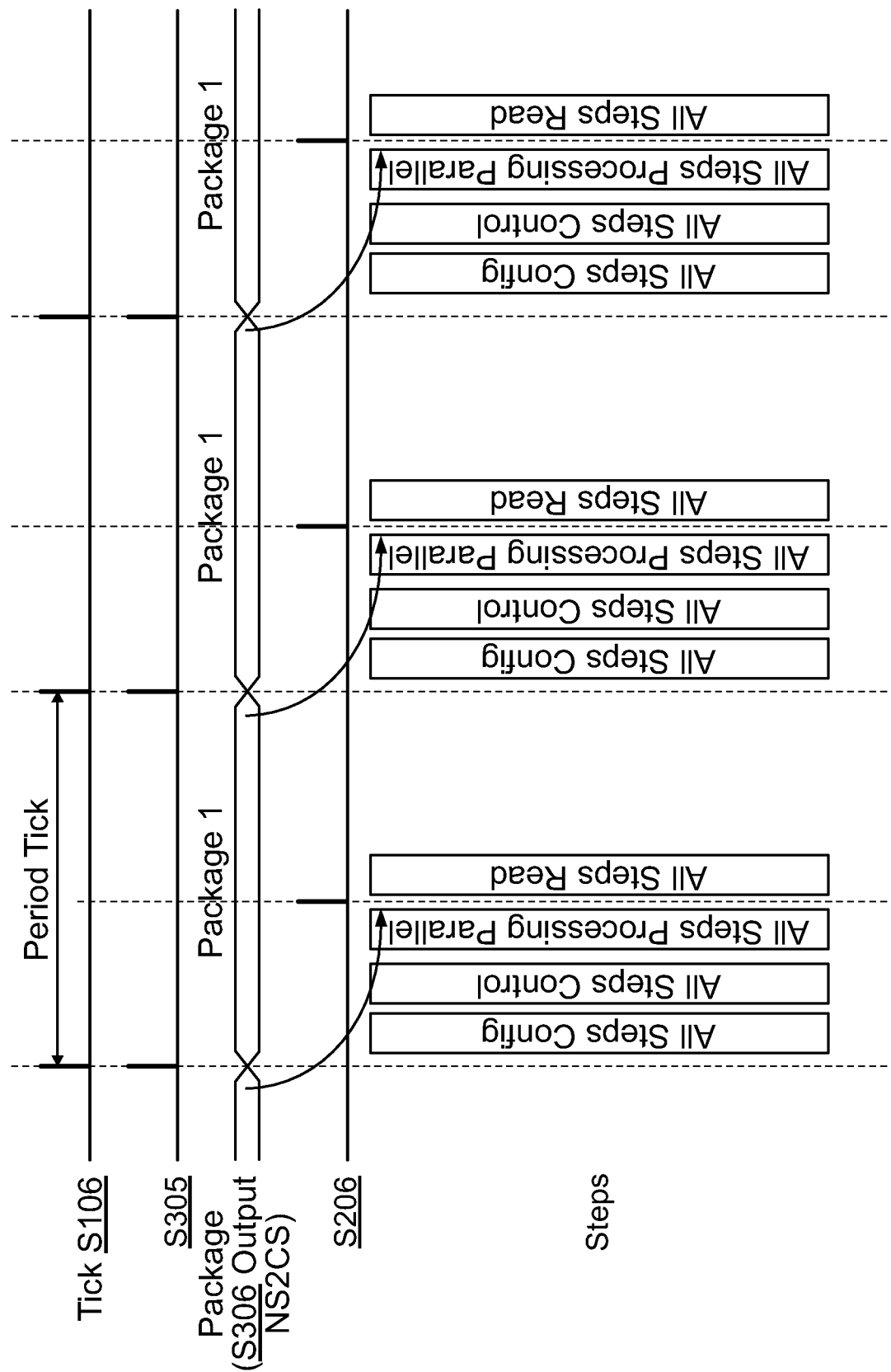
FIG. 8B shows a diagram of multi-channel navigation DMA of FIGS. 2B, 2C, 3, 5, and 7 operating in a CPU fully controlled mode of operation according to one embodiment.

FIG. 8B shows a diagram of multi-channel navigation DMA 205 (shown in FIGS. 2B, 2C, 3, 4A and 7) operation in CPU fully controlled mode.

A package corresponds to period tick S106. In CPU fully controlled mode, CPU 107 uses tick signals S106, S305 and S206 and fully controls GNSS signal processing using multi-channel navigation DMA 205 to control the steps Config, Control, and Read. Interface block NS2CS 202 starts to form package based on tick signal S106. CPU 107 receives signal S305 and executes Config and Control Steps. In Processing Step, multi-channel navigation DMA 205 transmits package to navigation channels 104 by command CPU 107. Multi-channel navigation DMA 205 finishes transmitting package and generates signal S206. CPU 107 receives signal S206 and executes Read Step. Then all the steps are repeated cyclically.

Figure 8C:
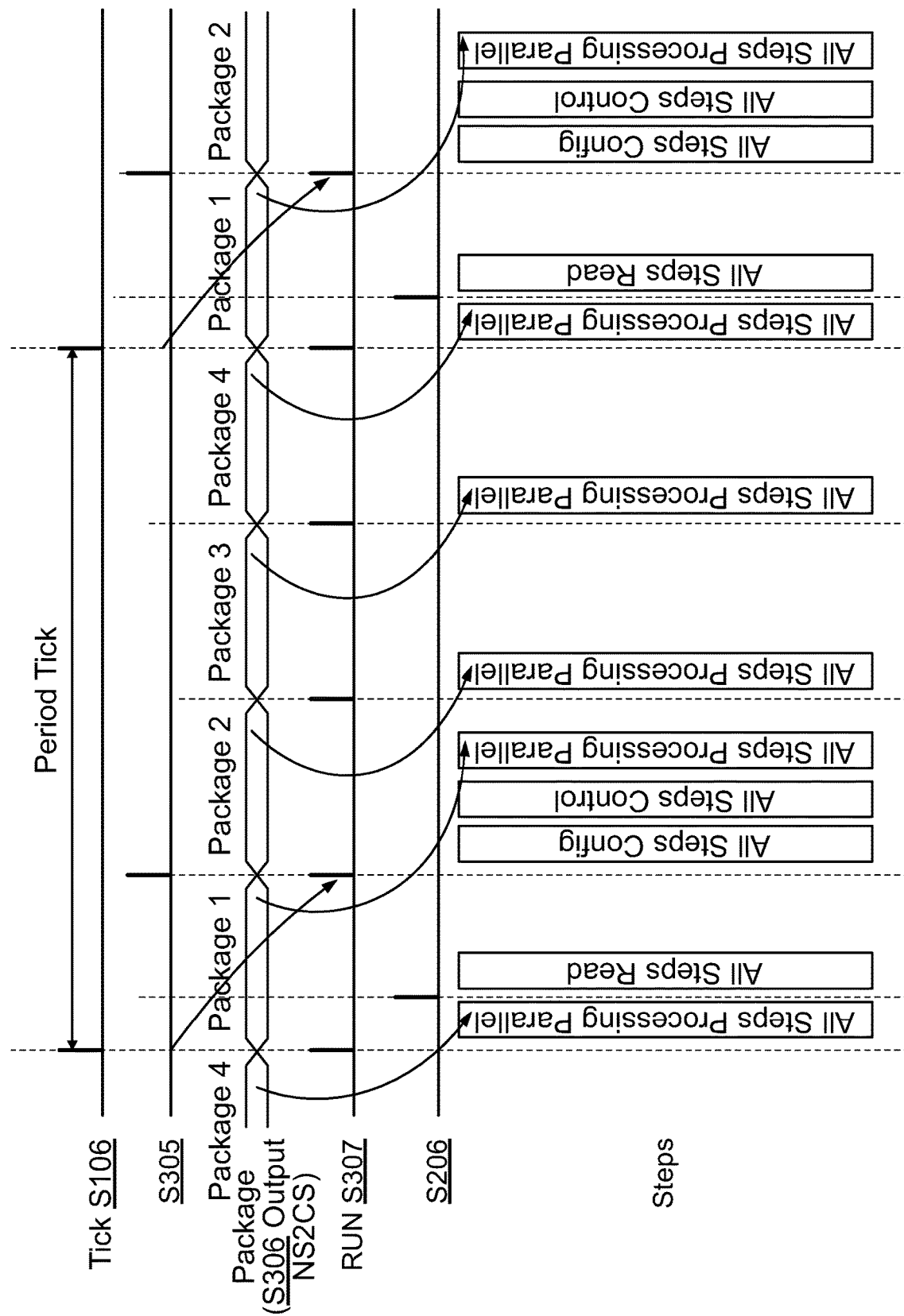
FIG. 8C shows a diagram of multi-channel navigation DMA of FIGS. 2B, 2C, 3, 5, and 7 operating in a First-try automatic mode of operation according one embodiment.

In one embodiment, FIG. 8C shows a diagram of multi-channel navigation DMA 205 operation in the First-try automatic (wherein 4 packages are formed per period of tick) mode.

Over period tick signal S106, four packages are formed (e.g., in multi packages mode). In First-try automatic mode, the processing of package 2 and package 3 does not require any control from CPU 107. After processing package 4, CPU 107 receives signal S206 and reads ready data from channels 500. NS2CS 202 starts to form a package by tick signal S106. CPU 107 receives signal S305 and executes Config and Control steps. In Processing step, multi-channel navigation DMA 205 transmits package 1 to Navigation channels 104 by command CPU 107. In Processing steps, multi-channel navigation DMA 205 transmits package 2, package 3 and package 4 to navigation channels 104 by signal S307. Multi-channel navigation DMA 205 finishes by transmitting package 4 and generates signal S206. CPU 107 receives signal S206 and executes Read step. Then all the steps are repeated cyclically.

Figure 9:
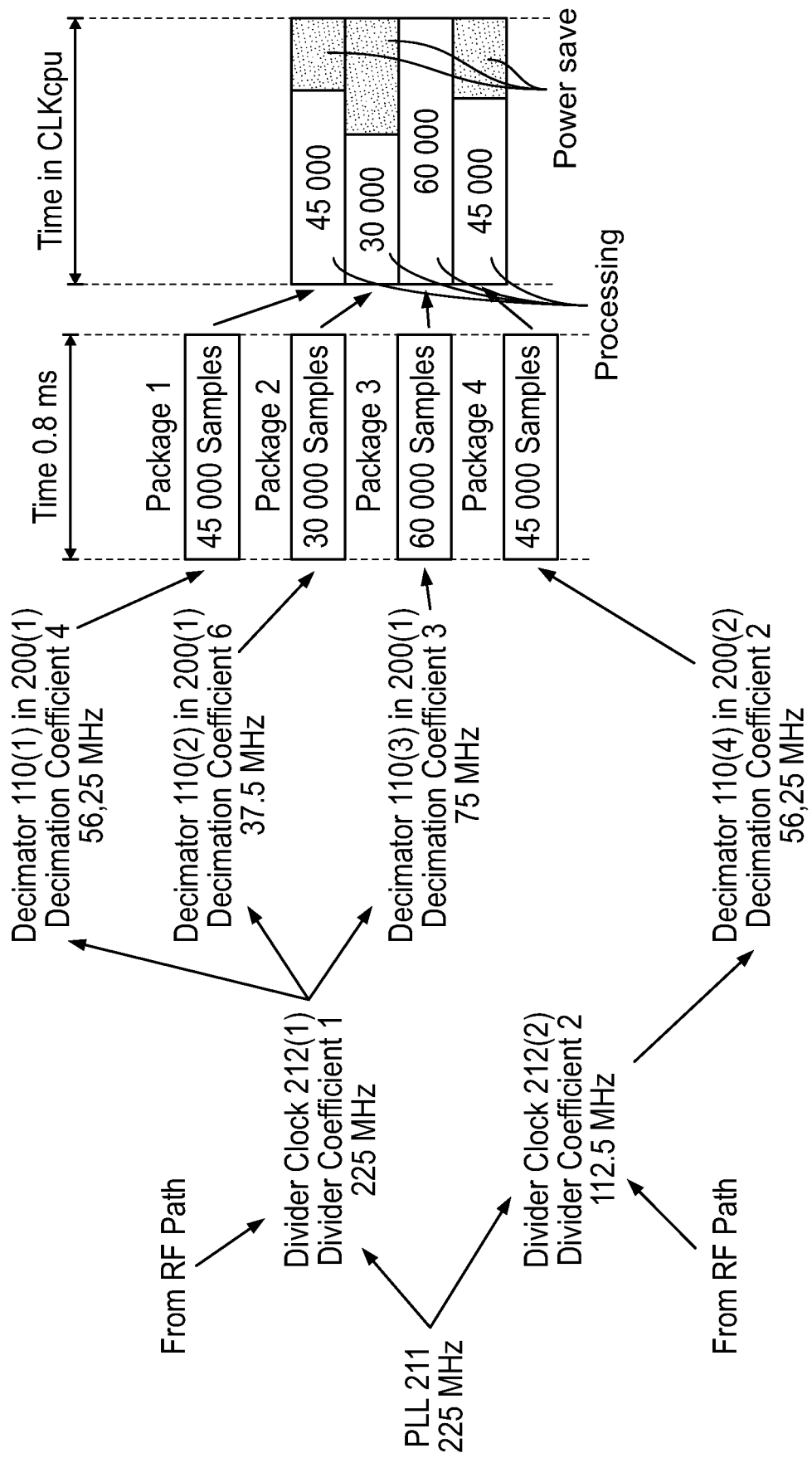
FIG. 9 shows frequency reduction and energy savings according to one embodiment.

In one embodiment, FIG. 9 shows frequency reduction and energy savings according to an embodiment using a quasi-asynchronous sampling frequency grid in which a package with a duration of 0.8 ms is sent. NS2CS interface blocks 202 form 4 packages. FIG. 9 is described in conjunction with components shown in other Figures.

PLL 211 generates a clock signal at a frequency of 225 MHz. This clock signal output from PLL 211 is input to divider clock 212(1) and divider clock 212(2). In divider clock 212(1), the division coefficient is 1, and the clock from PLL passes without changes. The clock frequency at the output of divider clock 212(1) is 225 MHz. In divider clock 212(2), the division factor is 2 and the clock from the PLL is divided by two. The clock frequency at the output of divider clock 212(2) is 112.5 MHz.

A clock signal output from divider clock 212(1) is input to navigation system 200(1). ADC 101 of navigation system 200(1) digitizes the signal received from the RF path that is output having frequency 225 MHz.

A clock signal output from divider clock 212(2) is input to navigation system 200(2). ADC 101 of navigation system 200(2) digitizes the signal received from the RF path that is output having frequency 112.5 MHz.

In navigation system 200(1), decimation coefficient in decimator 110(1) is 4. Samples with frequency 225 MHz are input to decimator 110(1), which outputs samples with frequency 56.25 MHz. Interface block NS2CS 202(1) (as shown in FIGS. 2B, 2C, and 3) generates package 1 which is equal to 45000 samples for the duration 0.8 ms.

In navigation system 200(1), decimation coefficient in decimator 110(2) is 6. Samples with frequency 225 MHz are input to decimator 110(2), which outputs samples with frequency 37.5 MHz. Interface block NS2CS 202(2) generates package 2 which is equal to 30000 samples for the duration 0.8 ms.

In navigation system 200(1), decimation coefficient in decimator 110(3) is 3. Samples with frequency 225 MHz are input to decimator 110(3), which outputs samples with frequency 75 MHz. Interface block NS2CS 202(3) generates package 3 which is equal to 60000 samples for the duration 0.8 ms.

In navigation system 200(2), decimation coefficient in decimator 110(4) is 2. Samples with frequency 112.5 MHz are input to decimator 110(4), which outputs samples with frequency 56.25 MHz. Interface block NS2CS 202(N) generates package 4 which is equal to 45000 samples for the duration 0.8 ms.

Package 1 . . . package 4 are formed at the same period of time. The number of samples in package 1 are equal to the number of samples in package 4. In package 1, package 2, and package 3, the number of samples are different.

Package 1 . . . package 4 are processed by a plurality of channels 500 at the same time. In channel 500, each sample of the package is processed for one pulse of clock signal CLKcpu. To process package 1 and package 4, 45000 pulses of clock signal CLKcpu are required. To process package 2 30000 pulses of clock signal CLKcpu are required. To process package 3 60000 clock pulses of clock signal CLKcpu are required. In channel 500 clock CLKcpu is enabled when the channel 500 processed data S501 (*i*) from 205.

The use of decimator 110 and divider clock 212 in navigation system 200 reduces the frequency of GNSS signal processing, which leads to a reduction in power consumption and a reduction in the size of the package due to fewer number of samples. Reduction in the size of packages by reducing the number of samples leads to a decrease in the processing time of packages using channels 500 and a decrease in energy consumption and also reduces size of memory used.

Navigation system 200 processes GNSS signals in a pipeline mode using clock signal CLKnav and generates packages using NS2CS interface blocks 202 providing a greater flexibility in GNSS signals processing. In one embodiment, each of NS2CS interface blocks generates packages one after another without any loss of data. The formation of packages is tied to tick signal S106. The packages are further processed in CPU System 210 based on clock signal CLKcpu.

In one embodiment, the GNSS receiver architecture includes several clock dividers 212, several navigation systems 200, and several decimators 110 that are utilized in order to reduce power consumption. In navigation system 200, the processed and decimated signals are converted into packages by a plurality of NS2CS interface blocks. Interface block NS2CS writes packages to memory 109. Packages in interface block NS2CS are formed at the same time, but have a different number of samples due to decimation.

After the completion of generation of packages in one period of time, multi-channel navigation DMA 205 reads the generated packages from memory 109 and transmits them to navigation channels 104.

Packages in navigation channels 104 can be processed in the following modes: CPU fully controlled mode and first-try automatic mode.

In one embodiment, in CPU fully controlled mode: CPU 107 controls all the processes and the package is equal to the period of tick signal S106.

In one embodiment, in first-try automatic mode: CPU 107 controls the process only once per some number of packages, specifically, between the period of tick signal S106. In this mode, the size of the package is reduced in several steps, and less storage space in memory 109 is required. Interface block NS2CS 202 automatically informs multi-channel navigation DMA 205 about readiness of a new package, and multi-channel navigation DMA 205 allows transmission of part of the packages to navigation channels 104 automatically. Multi-channel navigation DMA 205 reads packages from memory 109 and transmits it to navigation channels 104.

The use of clock divider 212 and decimator 110 causes the frequency of processing GNSS signals in navigation system 200 to be reduced, as well as the size of packages from NS2CS interface blocks 202. By reducing the size of the packages, the processing time in navigations channel 104 is reduced, which leads to a decrease in the power consumption of the GNSS receiver.

In one embodiment, a number of NS2CS interface blocks 202 write data to memory 109 via BUS 213, bypassing BUS 108. This reduces the load on BUS 108 and packages are written into memory 109 with minimal delays.

Figure 10:
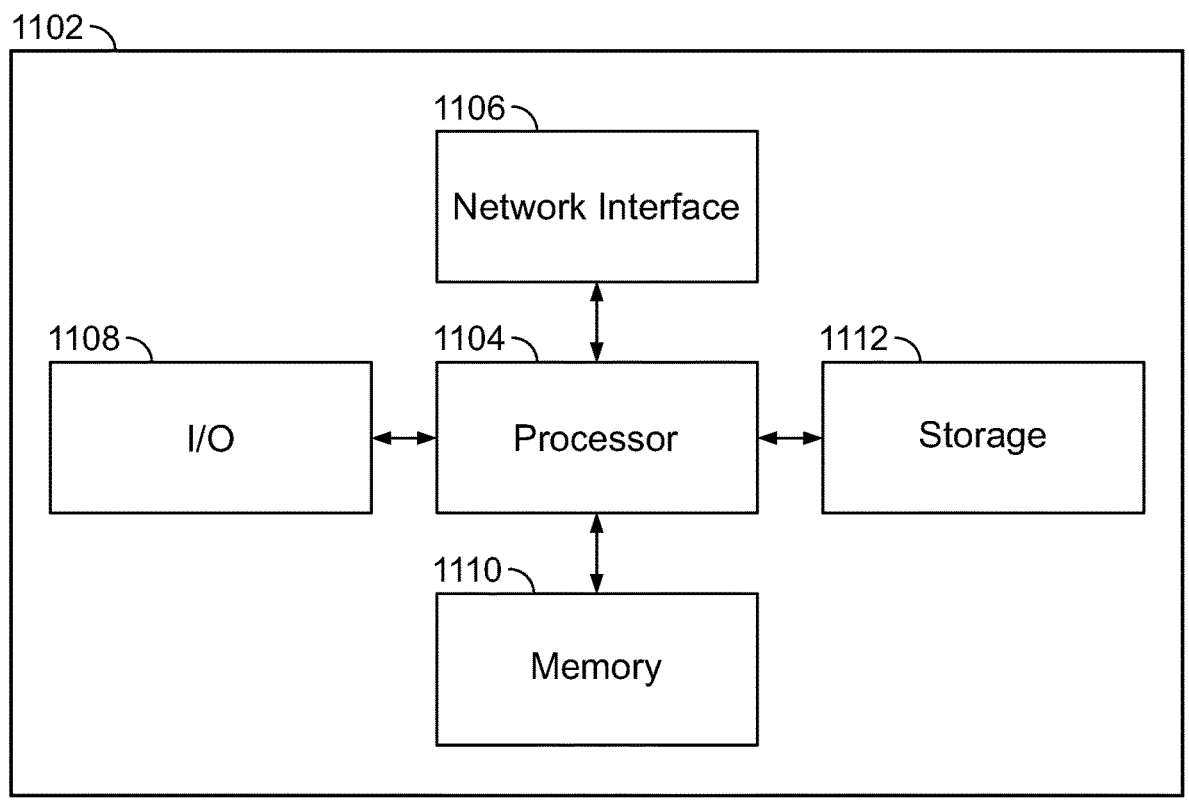
FIG. 10 shows a high-level block diagram of a computer for performing operations of the components described herein according to an embodiment.

In one embodiment, a computer is used to perform the operations of the components and equations described herein and shown, for example, in FIGS. 2A, 2B, 2C, 3, 5, and 7. The components may be, for example, ADCs, signal processors, re-quantizers, etc. A high-level block diagram of such a computer is illustrated in FIG. 10. Computer 1102 contains a processor 1104 which controls the overall operation of the computer 1102 by executing computer program instructions which define such operation. The computer program instructions may be stored in a storage device 1112, or other computer readable medium (e.g., magnetic disk, CD ROM, etc.), and loaded into memory 1110 when execution of the computer program instructions is desired. Thus, method steps described herein can be defined by the computer program instructions stored in the memory 1110 and/or storage 1112 and controlled by the processor 1104 executing the computer program instructions. For example, the computer program instructions can be implemented as computer executable code programmed by one skilled in the art to perform an algorithm defined by one of the various methods described herein. Accordingly, by executing the computer program instructions, the processor 1004 executes an algorithm defined by the method steps described herein. The computer 1102 also includes one or more network interfaces 1106 for communicating with other devices via a network. The computer 1102 also includes input/output devices 1108 that enable user interaction with the computer 1102 (e.g., display, keyboard, mouse, speakers, buttons, etc.) One skilled in the art will recognize that an implementation of an actual computer could contain other components as well, and that FIG. 10 is a high-level representation of some of the components of such a computer for illustrative purposes.

The foregoing Detailed Description is to be understood as being in every respect illustrative and exemplary, but not restrictive, and the scope of the inventive concept disclosed herein should be interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A navigation receiver comprising:
a plurality of RF paths configured to receive GNSS signals;
a phase-locked loop configured to generate a clock signal;
a plurality of clock dividers configured to receive the clock signal and to divide the clock signal;
a plurality of navigation systems, each of the plurality of navigation systems receiving a clock signal from one of the plurality of clock dividers, each of the plurality of navigation systems works own CLKnav and comprising:
a plurality of analog to digital convertors (ADCs) each configured to receive a GNSS signals from a respective one of the plurality of RF paths and generate a digitized signal;
a plurality of signal processors configured to process the digitized signals;
a plurality of decimators configured to decimate the digitized signals;
a plurality of signal processors configured to process the decimated signals;
a plurality of re-quantizers configured to convert the processed decimated signals into low-bit data;
a plurality of Navigation system to CPU System (NS2CS) interface blocks configured to generate packages of a pre-set size, based on the low-bit data;
a MUX interconnect configured to distribute data streams; and
a time control unit configured to generate a tick signal is a time scale;
a CPU system operating based on the tick signal, each navigation system in communication with the CPU system, the CPU system works CLKcpu and comprising:
a memory configured to store data and the packages;
a multi-channel navigation direct memory access (multi-channel navigation DMA) configured to convert the packages into data;
a plurality of hardware accelerators configured to process the packages;
a plurality of channels configured to process data received from the multi-channel navigation DMA; and
a CPU configured to control the plurality of navigation systems and the CPU system and configured to process data received from the plurality of channels, wherein
the CPU is configured to synchronize control between the plurality of decimators, the plurality of signal processors, the plurality of re-quantizers, the plurality of NS2CS interface blocks, the plurality of hardware accelerators, the plurality of channels and the multi-channel navigation DMA.

2. The navigation receiver of claim 1, wherein outputs of the plurality of re-quantizers are input to the plurality of NS2CS interface blocks via the MUX interconnect.

3. The navigation receiver of claim 1, wherein each of the plurality of NS2CS interface blocks writes a package into memory and generates an interrupt for the CPU, CPU processes interrupt from plurality of NS2CS interface blocks.

4. The navigation receiver of claim 1, wherein each of the plurality of NS2CS interface blocks writes a package into memory and generates a RUN signal.

5. The navigation receiver of claim 1, wherein each of the plurality of NS2CS interface blocks begins to form package based on the tick signal and re-synchronizes data from a clock signal CLKnav to a clock signal CLKcpu.

6. The navigation receiver of claim 1, wherein each of the plurality of NS2CS interface blocks generates one package over period of the tick signal.

7. The navigation receiver of claim 1, wherein each of the plurality of NS2CS interface blocks generates a plurality of packages during the period of the tick signal.

8. The navigation receiver of claim 1, wherein packages formed for the same time contain a different number of low-bit data samples.

9. The navigation receiver of claim 1, wherein multi-channel navigation DMA reads packages formed at the same time from the memory from the plurality of NS2CS interface blocks and converts packages into data and transmits that data and enabling signal to the plurality of channels.

10. The navigation receiver of claim 9, each of the plurality data from the multi-channel navigation DMA has its own enable signal.

11. The navigation receiver of claim 9, further comprising:
a commutator of channel receives data transmitted from the multi-channel navigation DMA for the plurality of channels, wherein if a selected enable signal is available, a respective data is processed in the channel.

12. The navigation receiver of claim 1, wherein the multi-channel navigation DMA reads packages from the memory in response to a signal from the CPU.

13. The navigation receiver of claim 4, wherein the multi-channel navigation DMA reads packages from the memory based on a RUN signals.

14. The navigation receiver of claim 1, wherein the multi-channel navigation DMA fixes the data readiness in the plurality of channels based on integration period signals, and the CPU reads them after data processing.

15. The navigation receiver of claim 1, wherein the CPU reads data from the plurality of channels and sends a current configuration of Channel and control of Channels between processing packages.

16. The navigation receiver of claim 1, wherein the CPU and the plurality of NS2CS interface blocks have access to the memory through a common BUS or a dedicated BUS.

17. The navigation receiver of claim 9, wherein once the last package in a current period of the tick signal has been formed, the multi-channel navigation DMA transmits an interrupt request signal to the CPU, CPU processes interrupt request signals.

18. The navigation receiver of claim 1, wherein data from outputs of the re-quantizers forming the same number of samples in one period of time is converted by one NS2CS into a package.

19. The navigation receiver of claim 1, wherein the decimated signal is processed on a lowered clock that is synchronous with clock signal CLKnav.

20. The navigation receiver of claim 1, wherein channel clock CLKcpu is enabled when the channel processed data from multi-channel navigation DMA.

* * * * *